(12) United States Patent
Butler et al.

(10) Patent No.: US 10,584,458 B1
(45) Date of Patent: Mar. 10, 2020

(54) SINGLE BLADE PILE CUTTING SYSTEM

(71) Applicant: Joseph Dustin Butler, Jackson, LA (US)

(72) Inventors: Joseph Dustin Butler, Jackson, LA (US); Clint Musemeche, Broussard, LA (US)

(73) Assignee: Joseph Dustin Butler, Jackson, LA (US)

( * ) Notice: Subject to any disclaimer, the term of this patent is extended or adjusted under 35 U.S.C. 154(b) by 219 days.

(21) Appl. No.: 15/883,464

(22) Filed: Jan. 30, 2018

Related U.S. Application Data

(60) Provisional application No. 62/452,628, filed on Jan. 31, 2017.

(51) Int. Cl.
| | | |
|---|---|---|
| *E02D 9/00* | (2006.01) | |
| *B28D 1/04* | (2006.01) | |
| *B23D 45/00* | (2006.01) | |
| *G05B 15/02* | (2006.01) | |
| *B23D 59/00* | (2006.01) | |
| *B23D 47/02* | (2006.01) | |

(52) U.S. Cl.
CPC ............ *E02D 9/00* (2013.01); *B23D 45/003* (2013.01); *B23D 47/02* (2013.01); *B23D 59/002* (2013.01); *G05B 15/02* (2013.01)

(58) Field of Classification Search
CPC ........ E02D 9/02; B23D 47/02; B23D 59/002; B28D 1/02
See application file for complete search history.

(56) References Cited

U.S. PATENT DOCUMENTS

| | | | | |
|---|---|---|---|---|
| 4,144,867 A | * | 3/1979 | Wachs ................. | B28D 1/04 125/14 |
| 4,233,954 A | * | 11/1980 | Visser .................. | B28D 1/04 125/14 |
| 4,318,391 A | * | 3/1982 | Wachs .................. | E02D 9/005 125/14 |
| 4,368,720 A | * | 1/1983 | Destree ............... | B23D 45/006 125/14 |
| 5,107,594 A | * | 4/1992 | Ferreras ............. | B27B 17/0058 30/372 |
| 8,118,018 B1 | * | 2/2012 | Sherment ............ | B28D 1/046 125/13.01 |
| 9,790,656 B1 | * | 10/2017 | McKnight .......... | E02D 9/005 |

* cited by examiner

*Primary Examiner* — Dung Van Nguyen
(74) *Attorney, Agent, or Firm* — Law Office of Jesse D. Lambert, LLC

(57) ABSTRACT

A pile cutter, suitable for cutting of steel reinforced concrete piles, has a frame with a pile receiving area and a generally U-shaped track around the pile receiving area. A single saw blade, for example a diamond tipped rotary saw blade, is carried on a saw blade carriage assembly, which is movably mounted on the U-shaped track. The dimensions of the various components are such that the saw blade cuts past a center line through the pile receiving area. By moving the saw blade carriage assembly first to one end of the U-shaped track, then to the other end, the pile can be completely severed.

17 Claims, 11 Drawing Sheets

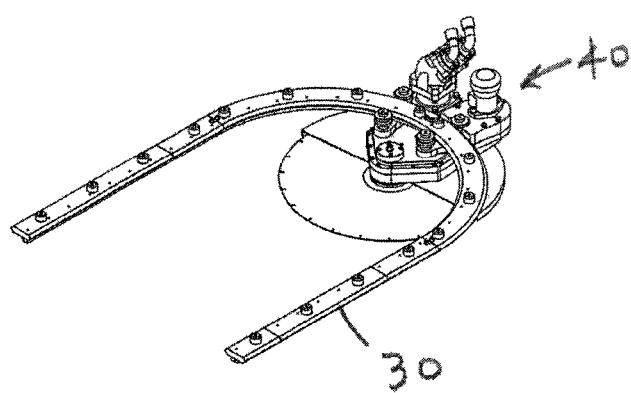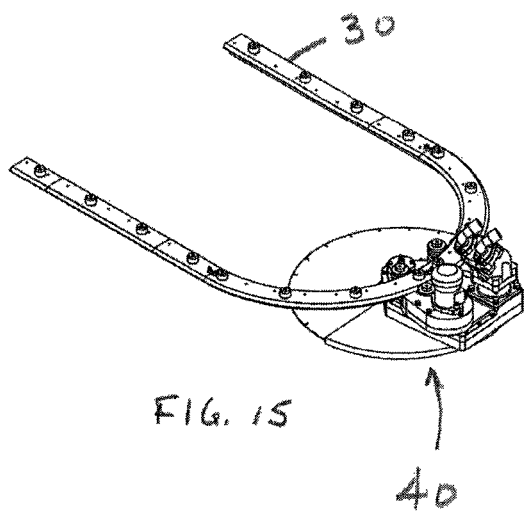
FIG. 14
FIG. 15

SINGLE BLADE PILE CUTTING SYSTEM

CROSS REFERENCE TO RELATED APPLICATIONS

This United States non-provisional patent application claims priority to U.S. provisional patent application Ser. 62/452,628, filed Jan. 31, 2017, for all purposes. The disclosure of that provisional patent application is incorporated herein, to the extent not inconsistent with this disclosure.

BACKGROUND

Field of the Invention

This invention relates to apparatus for cutting of piles, especially steel reinforced concrete foundation piles, frequently used in construction projects of different sorts.

After concrete piles have been installed, later projects may require the removal of the pilings, at least down to ground level. This requires cutting the pile, with some form of saw apparatus, and removing same with a crane or similar apparatus. As can be readily appreciated, the cutting of a large diameter concrete pile, reinforced with steel rebar, can be a challenge.

The known prior art pile cutting systems all present various issues, giving rise to a desire for an improved pile cutting system that addresses these issues.

SUMMARY OF THE INVENTION

Broadly, the single blade pile cutting system embodying the principles of the present invention comprises a single, typically hydraulically powered circular saw blade (typically a diamond tipped saw blade), which is carried on a movable saw blade carriage assembly, which moves around a U-shaped track via a ring and pinion gear arrangement. In more detail, the single blade pile cutting system comprises a main frame which carries and supports the majority of the remaining components. The frame, when viewed from above (or below), comprises a generally U-shaped pile receiving area, with a center line defined therein, when viewed from above. Mounted within the pile receiving area is the U-shaped track, preferably a toothed track, essentially forming a U-shaped rack gear. The teeth of the rack gear may be oriented outwardly, away from the pile receiving area. A single power saw blade, preferably a diamond tipped saw blade adapted for concrete and reinforced steel cutting, along with a powered rotary driver such as a hydraulic motor powering the saw blade, is mounted on the carriage, which in turn rides on a plurality of rollers which engage mating edge surfaces on the U-shaped track. The carriage is thus supported on the track, and by means of a powered pinion engaging the rack gear on the U-shaped track, the blade and carriage are carried around the U-shaped track. In addition to the saw blade hydraulic motor, a hydraulic motor powering the pinion gear is carried on the carrier. The powered pinion and the rack gear form one embodiment of a means for moving the saw blade carriage assembly around the U-shaped track.

As noted above, the saw blade carriage assembly rides on a plurality of rollers, which engage mating edge profiles on the U-shaped track (inside and outside). Preferably, there are a total of four rollers, with two rollers each mounted on one of two pivot arm assemblies (each roller arm having an inner and outer roller); in addition, one pivot arm assembly carries the carriage drive pinion gear. The pivot arms pivot about points along the longitudinal centerline of the U-shaped track.

Preferably, a pile gripping mechanism is provided within the pile receiving area, and comprises a movable plate structure, which can be moved inwardly and outwardly to adjust for different pile sizes and engages one side of the (typically square in cross section) pile. On the other side of the pile receiving area are upper and lower gripping pads, which are hydraulically forced inwardly to firmly grip the apparatus to the pile.

The relative dimensions of the saw blade diameter, the width of the U-shaped track, and the dimensions of other components ensure that the saw blade cuts past the center line of the pile receiving area. In this manner, with a pile gripped by the apparatus in the pile receiving area, a transit of the saw blade about the path defined by the U-shaped track, i.e. substantially from one end of the U-shaped track to the other end, ensures that the pile is cut completely through.

To use the apparatus, it is lifted and positioned (typically via an excavator, crane, or any other apparatus capable of lifting and positioning the apparatus) such that a pile is received within the pile receiving area, with the frame therefore surrounding the pile save for the open throat area. The pile gripping mechanism is engaged, which grips the pile tightly within the pile receiving area and effectively locks the apparatus to the pile. Via appropriate controls, the saw blade hydraulic drive motor is powered, starting the saw blade revolving; note that in its initial position, the saw blade is in a central, innermost position on the U-shaped track, and is not contact with the pile. Next, the saw blade carriage drive pinion gear is powered, moving the saw blade carriage assembly and saw blade along the U-shaped track, and into contact with the pile. Preferably, a control system, preferably comprising a digital processor along with other elements, keeps the saw blade advancing and cutting through the pile at a desired rate. When the saw blade carriage assembly reaches one end of the U-shaped track, it reverses (as controlled by the control system if provided), and travels along the U-shaped track to the opposite end, in the process the saw blade completely severing the pile.

It is understood that electric and/or pneumatic drive motors may be used instead of hydraulic drive motors, to turn the saw blade and to drive the saw blade carriage drive motor.

BRIEF DESCRIPTION OF THE DRAWINGS

FIGS. 14 and 15 are perspective views of the saw blade carriage and saw blade assembly positioned on the U-shaped track.

DESCRIPTION OF THE PRESENTLY PREFERRED EMBODIMENT(S)

The single blade pile cutting system, referred to herein at times as "pile cutter," is shown as element 10 in the figures. While various pile cutting systems can embody the principles of the present invention, with reference to the drawings some of the presently preferred embodiments can be described.

Figure 1:
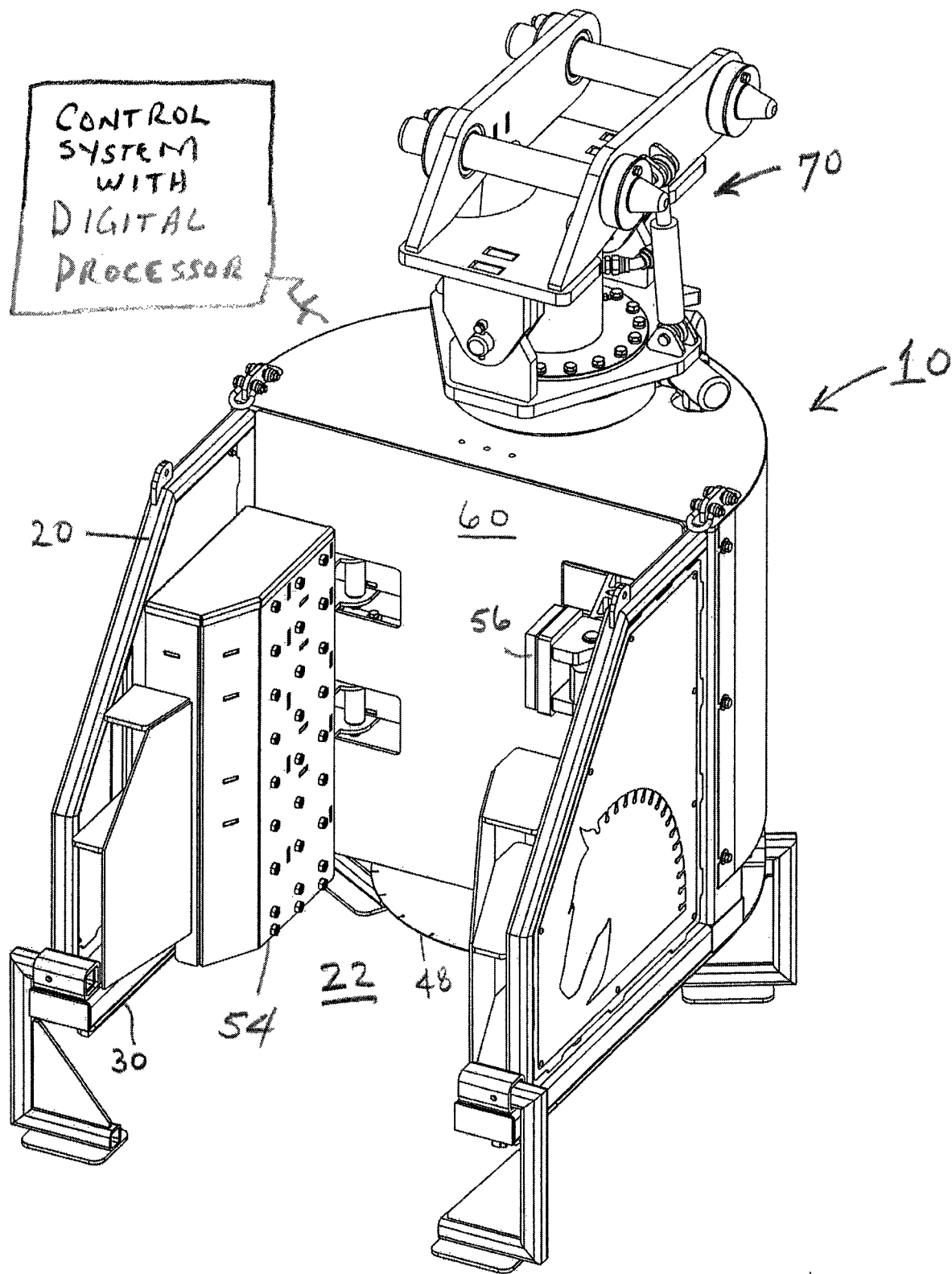
FIG. 1 is a front perspective view of one embodiment of the single blade pile cutting system ("pile cutter") embodying the principles of the present invention.
Figure 2:
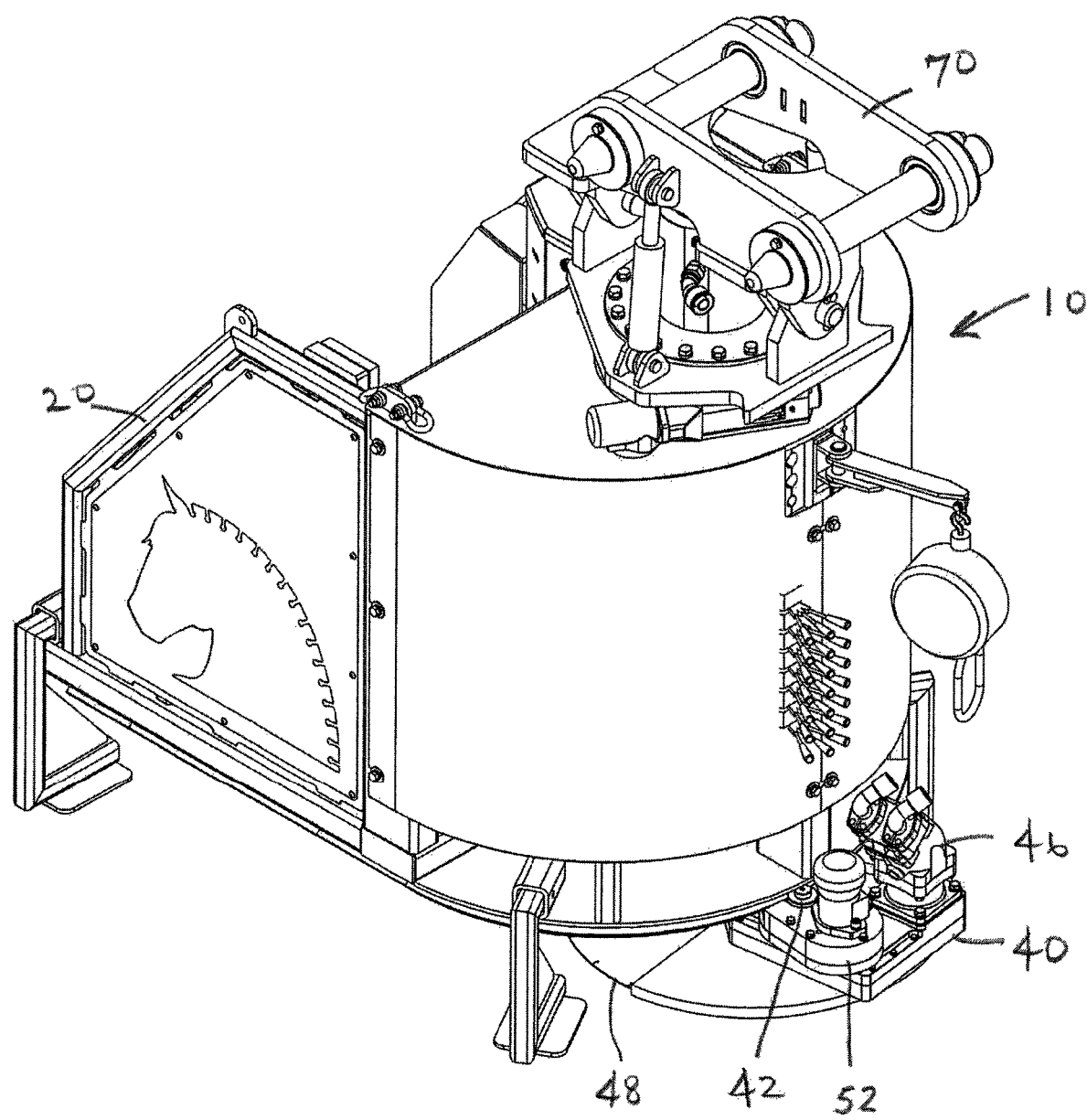
FIG. 2 is a back perspective view of the pile cutter.
Figure 3:
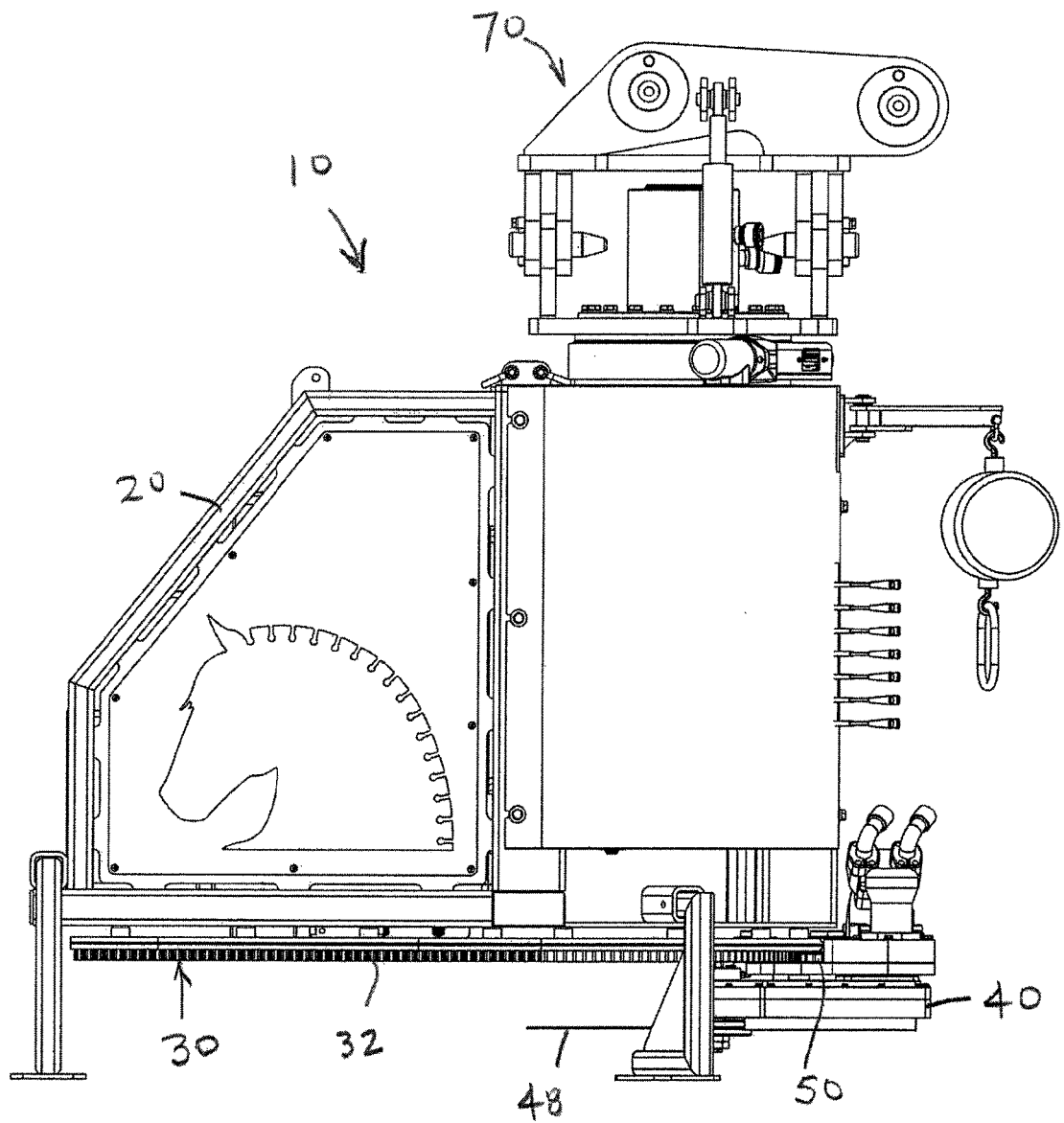
FIG. 3 is a left side view of the pile cutter; it is understood that the right side view is substantially a mirror image of this view.
Figure 4:
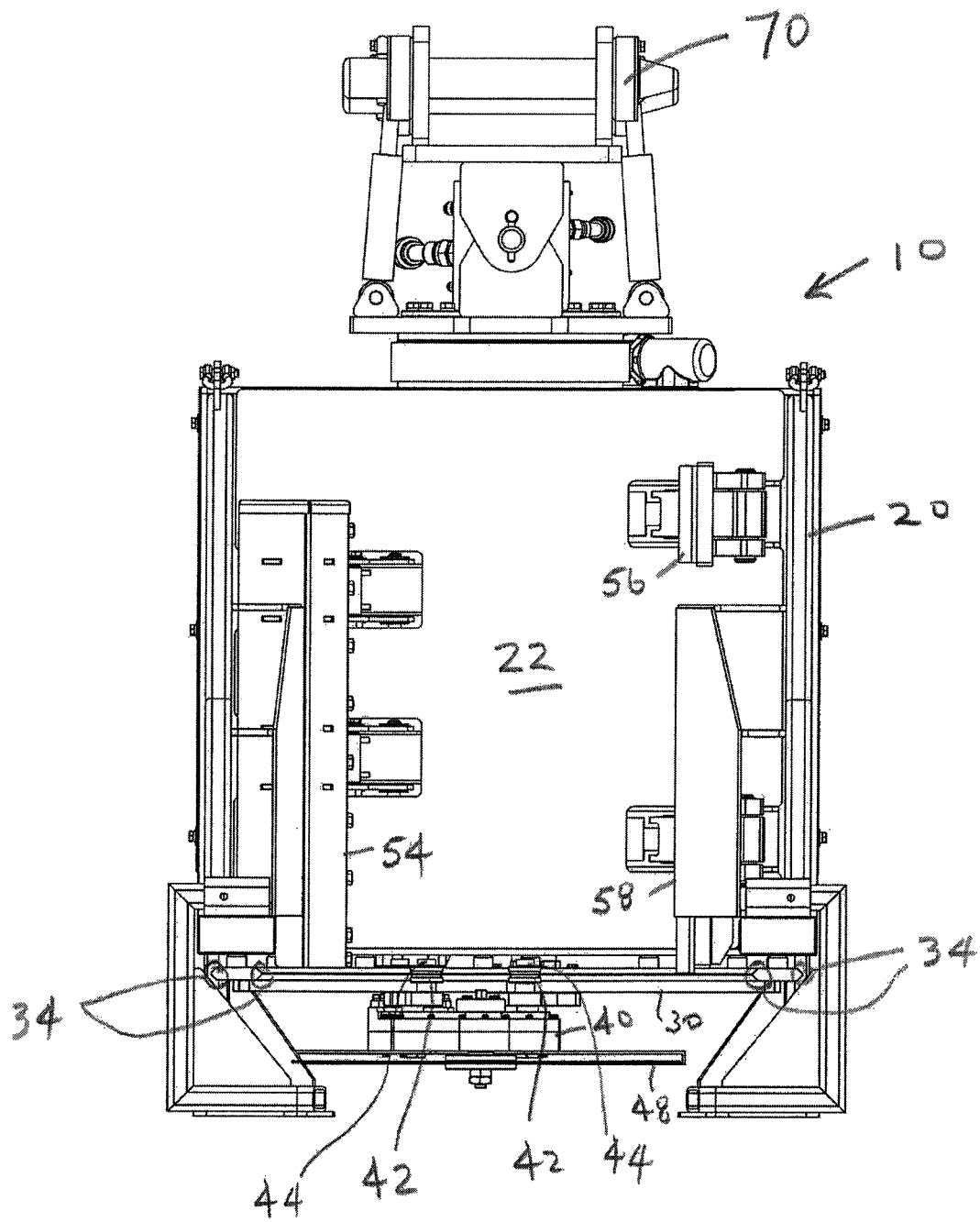
FIG. 4 is a front view of the pile cutter.
Figure 5:
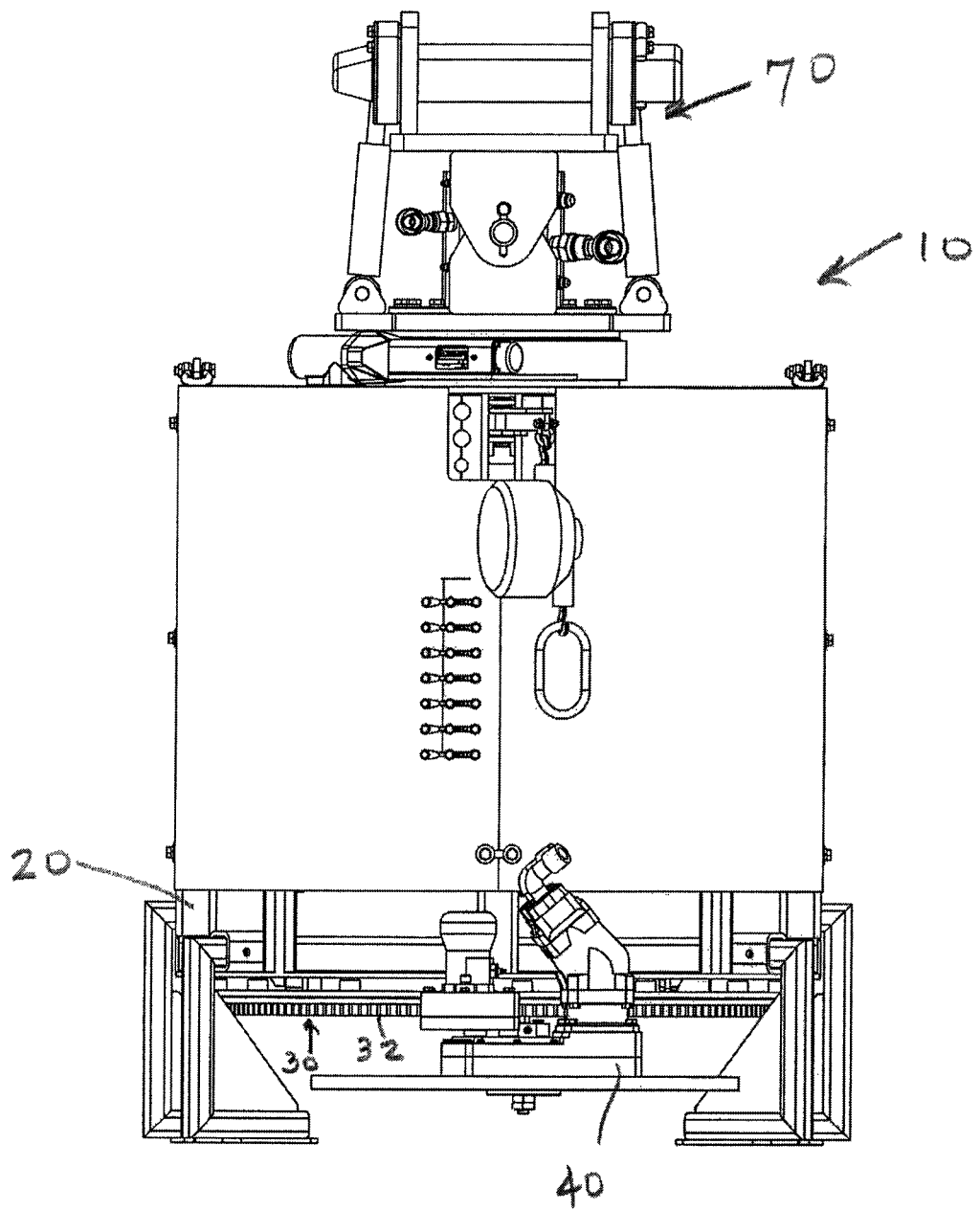
FIG. 5 is a back view of the pile cutter.
Figure 6:
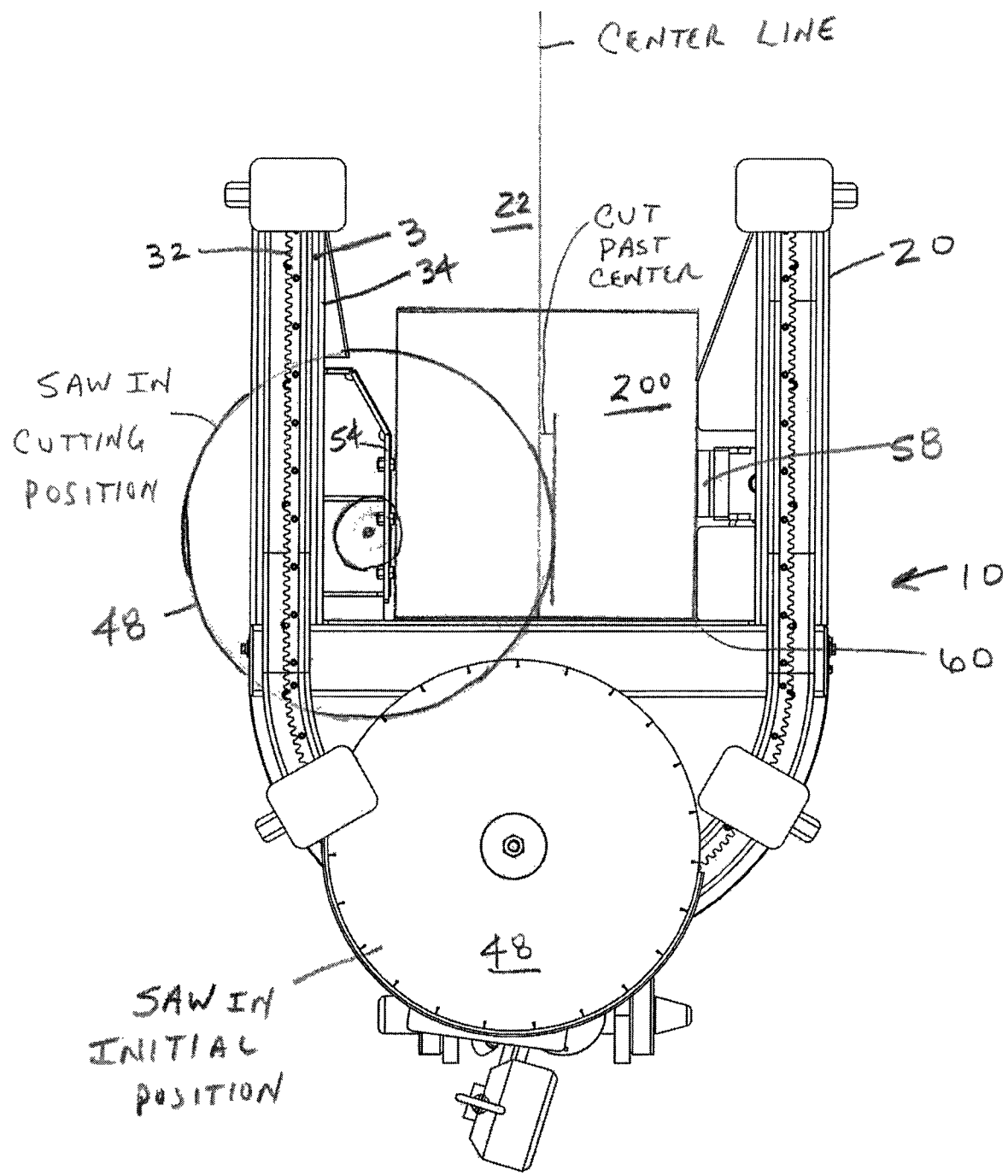
FIG. 6 is a bottom view of the pile cutter.
Figure 7:
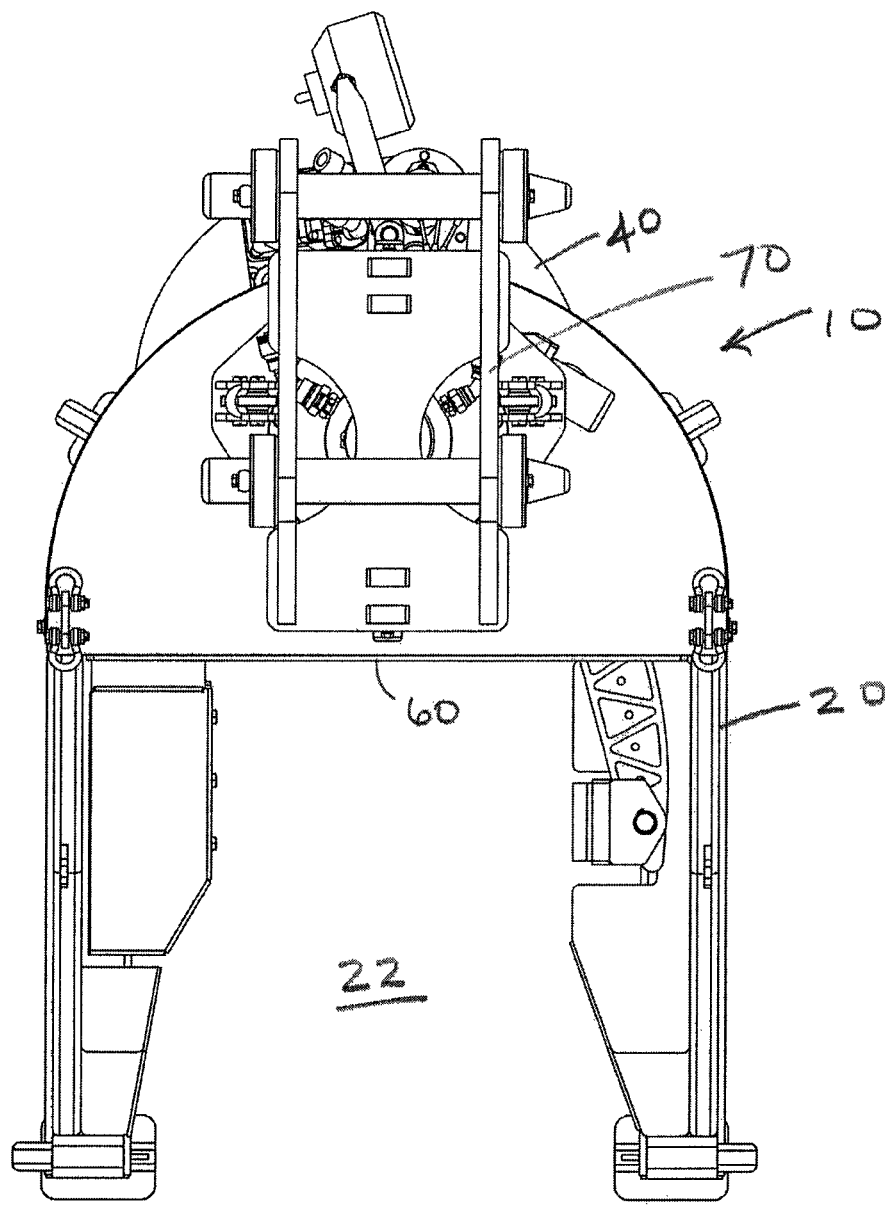
FIG. 7 is a top view of the pile cutter.

A frame 20 comprises a pile receiving area 22 (best seen from a top or bottom view), and carries most of the other components of the pile cutter. A generally U-shaped track 30 is mounted on frame 20, generally positioned within pile receiving area 22. U-shaped track 30 comprises a rack gear 32, which may have its gear teeth outwardly facing, as can be seen especially in FIGS. 2-6. U-shaped track 30 also comprises inwardly- and outwardly-facing beveled edges 34, as can also be seen in FIGS. 2-6. U-shaped track 30 has a center line defined through pile receiving area 22 when viewed from above, as best seen in FIG. 6.

A saw blade carriage assembly 40 is movably mounted on U-shaped track 30 by two pairs (4 total) of rollers 42, which have inner profiles which mate with and engage beveled edges 34 on the U-shaped track, the rollers 42 in turn connected to a pair of pivot arm assemblies 44 and 45 which are pivotally mounted to the carriage. It can be readily understood that saw blade carriage assembly 40 is thus suspended from U-shaped track 30 by the rollers, but can move about the length of the track via the rollers. Pivot arms 44 have pivot points which lie along the center longitudinal axis of U-shaped track 30. It is understood that different arrangements, with different numbers of pivot arm assemblies and rollers thereon, may be used.

A means for moving saw blade carriage assembly 40 is provided, which in a presently preferred embodiment comprises a drive pinion gear 50, driven by a rotary drive means such as pinion drive motor 52 (typically a hydraulic motor), also mounted on saw blade carriage assembly 40. It is understood that the teeth of drive pinion 50 engage the teeth of rack gear 32, so that rotation of drive pinion gear 50 moves saw blade carriage assembly 40 along U-shaped track 30, in a desired direction. It is further understood that one or more idler gears, not shown, are typically interposed between the pinion drive motor 52 and drive pinion gear 50. It is understood that pinion drive motor 52 may also be an electric or pneumatic motor, instead of hydraulic.

A powered rotary driver, e.g. saw blade drive motor 46, is mounted to saw blade carriage assembly 40, and in turn is connected to saw blade 48, which is typically a diamond tipped saw blade, suitable for cutting steel rebar reinforced concrete piles. Saw blade drive motor 46 may be hydraulic, electric, or pneumatically powered.

Preferably, a means for gripping a pile is provided, which in a presently preferred embodiment comprises a hydraulically powered plate 54 positioned on one side within pile receiving area 22, with opposing gripping pads as described below. Plate 54 can be positioned and locked into place, in a position which accommodates a desired pile size and centers the apparatus on the pile. On the opposite side of pile receiving area 22 are a pair of opposing gripping pads 56 and 58, which are hydraulically powered. It is understood that once pile cutter 10 is positioned around a pile 200, gripping pads 56 and 58 are moved inwardly hydraulically so as to tightly grip pile 200 and lock the apparatus to the pile (see FIG. 6), fixing pile cutter 10 in position relative to pile 200. It is understood that in some embodiments and/or applications, pile cutter 10 need not be locked to the pile, hence a means for gripping a pile may not be provided, or if provided not used on a particular job.

Preferably, a back plate 60 is at a rear portion of pile receiving area 22, and prevents pile 200 from moving any further back into pile receiving area 22. Depending upon the particular pile cutting operation, pile 200 may not be moved far enough back into pile receiving area 22 to contact back plate 60. As can be seen in FIG. 6, when saw blade carriage assembly 40 is in its rearmost position, saw blade 48 does not enter into pile receiving area 22 and is not in contact with a pile positioned therein.

A top attachment 70 provides a means for attachment to a lifting device, such as a crane, an excavator, or similar devices, so as to lift and position the apparatus. Preferably, top attachment 70 comprises hydraulic cylinders and attachment means to permit pile cutter 10 to be tilted from a vertical axis, and to be rotated relative to the excavator (or other device) from which it is suspended. Such attachments are commonly known as "rotator tilt attachments."

It is to be understood that the relative dimensions of the diameter of saw blade 48, and the width of U-shaped track 30 (and dimensions of other components of the system) result in saw blade 48 cutting somewhat past the center line of pile receiving area 22, when saw blade carriage 40 is positioned on either side of U-shaped track 30. By this geometry, as the saw blade traverses the U-shaped track from one side to the other (described in more detail below), pile 200 is always completely severed. FIG. 6 shows saw blade 48 in its rearmost position, and also in position on one side of U-shaped track 30, illustrating the edge of saw blade 48 past the centerline of pile receiving area 22, and of any pile within. It is understood that when saw blade 48 is on the other side of U-shaped track 30, pile 200 will be completely severed.

Figure 8:
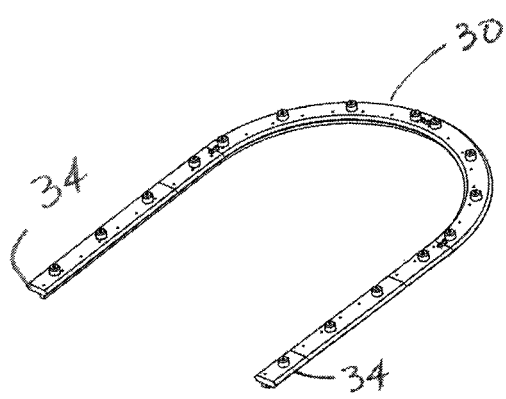
FIGS. 8 and 9 are perspective views of the U-shaped track.
Figure 9:
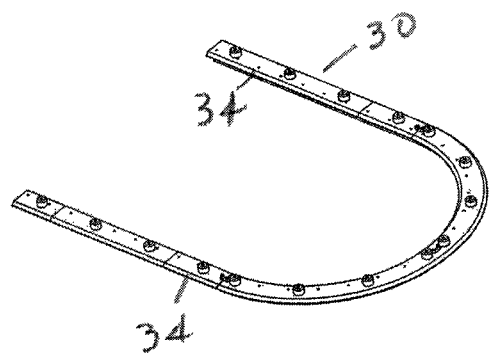
Figure 10:
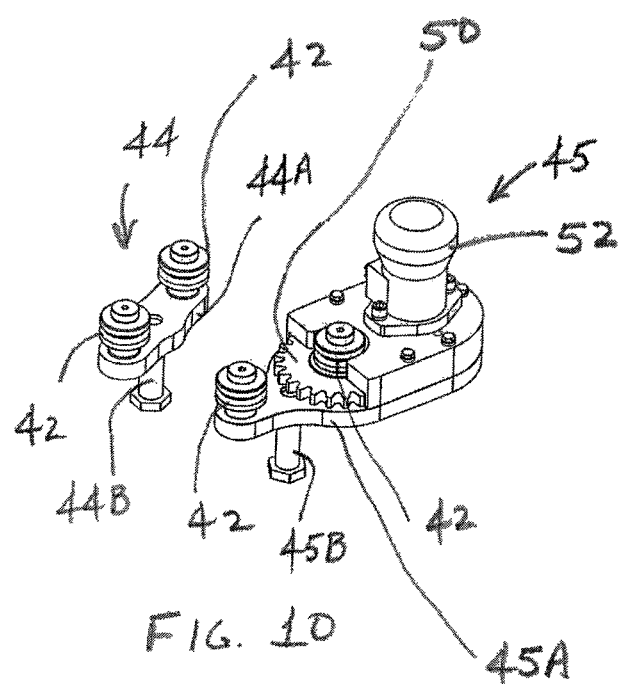
FIGS. 10 and 11 are perspective views of the pivot arm assemblies.
Figure 11:
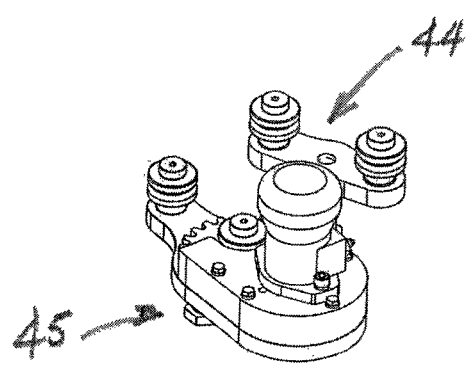

FIGS. 8-15 show additional detail of the U-shaped track, saw blade carriage assembly and related elements. FIGS. 8 and 9 are perspective views of the U-shaped track 30, showing its shape including the beveled edges 34 which the rollers engage, the positioning of the rack gear, etc. FIGS. 10 and 11 show additional detail of the pivot arm assemblies 44 and 45. Each pivot arm assembly holds a pair of rollers 42. FIG. 10 shows pivot arm assembly 44, comprising an arm member 44A on which rollers 42 are mounted, and a pivot pin 44B which connects pivot arm assembly 44 to saw blade carriage assembly 40. The other pivot arm assembly 45, comprises a pair of rollers 42, arm member 45A and a pivot pin 45B. In addition, pivot arm assembly 45 comprises drive pinion gear 50 which engages the rack gear 32, and hydraulic pinion drive motor 52 which turns drive pinion gear 50 through an idler gear assembly, not shown. FIG. 11 shows pivot arm assemblies 44, 45 from a different angle.

Figure 12:
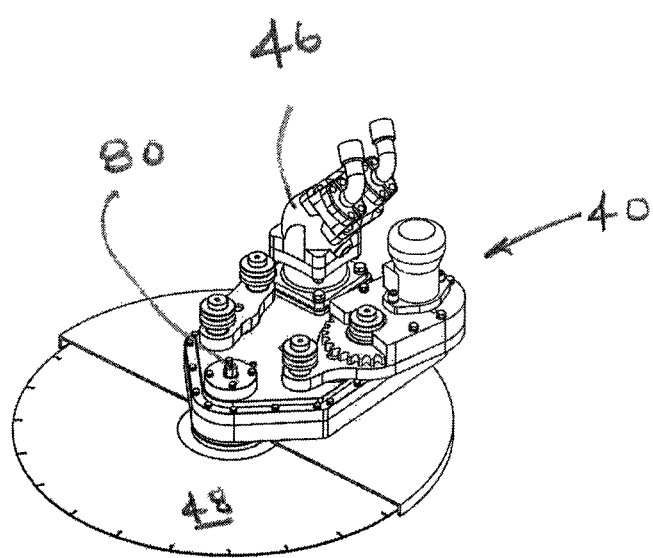
FIGS. 12 and 13 are perspective views of the saw blade carriage and saw blade assembly.
Figure 13:
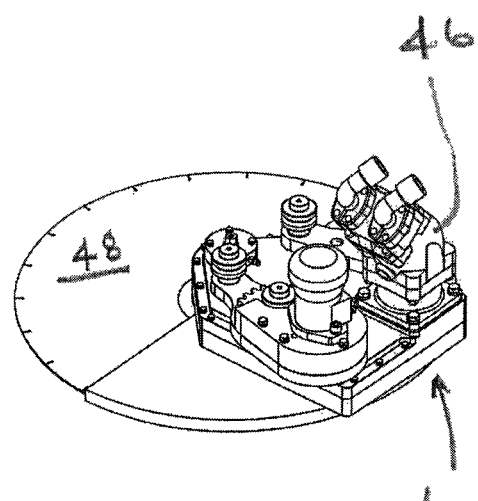

FIGS. 12 and 13 show further detail of saw blade carriage assembly 40. In addition to the pivot arm assemblies, saw blade carriage assembly 40 comprises saw blade drive motor 46, typically a hydraulic motor, which drives a gear assembly ultimately connected to saw blade 48, thus rotating same. Preferably, water or other fluid is fed through inlet 80 onto saw blade 48, to cool and lubricate saw blade 48 while cutting, as is common in the art. FIG. 13 shows saw blade carriage assembly 40 from another angle.

FIGS. 14 and 15 show saw blade carriage assembly 40 mounted on U-shaped track 30. The carriage assembly is mounted to U-shaped track 30 by rollers 42, which have suitably shaped throat profiles which engage beveled edges 34 on U-shaped track 30, effectively suspending saw blade carriage assembly 40 from U-shaped track 30. Drive pinion gear 50 engages rack gear 32. It is readily understood that rotation of drive pinion gear 50 moves saw blade carriage assembly 40 around U-shaped track.

It is understood that hydraulic motors/hydraulic fluid delivery systems (pumps), hoses, and a control system comprising a digital processor(s), controllers etc. and other related elements, known in the relevant art, are provided as necessary to make the system operable in an efficient manner. In other embodiments, movement of the saw blade and saw blade carriage assembly may be manually controlled.

Use of the Pile Cutter

An exemplary, although not exclusive, operation of pile cutter 10 can be described. Pile cutter 10, typically suspended from an excavator, crane or any other similar apparatus capable of suspending and positioning same, is maneuvered into position around a pile 200, at a desired cut-off height. Pile cutter 10 is positioned so that pile 200 is butted up against back plate 60, in the position shown in FIG. 6. It is understood that in some situations, it may not be possible or desirable for pile 200 to butt up against back plate 60, in such cases pile 200 is simply positioned farther toward the throat of the pile receiving area. The means for gripping pile 200, namely the hydraulic clamping system comprising plate 54 and gripping pads 56 and 58, is actuated so as to lock pile cutter 10 to pile 200. It is understood that in some embodiments of pile cutter 10, no means for gripping pile 200 is provided; and in some cases, pile 200 is not gripped even if a means for gripping is provided.

Rotation of saw blade 48 is commenced by powering the rotary drive means, such as supplying hydraulic fluid to saw blade drive motor 46, which turns one or more gears in a gear train connected to saw blade 48, thus rotating saw blade 48. As previously noted, saw blade 48 is initially in the position shown in FIG. 6, out of engagement with pile 200. Once the desired saw blade rotational speed is achieved, appropriate controls are engaged to commence moving saw blade carriage assembly 40 (via the hydraulically drive pinion gear 50 and the above-described gear arrangement) in one direction along U-shaped track 30. Saw blade 48 gradually engages pile 200, and is moved at a suitable speed as it cuts through pile 200. Saw blade 48 continues to move and cut until it reaches one end of U-shaped track 30.

Appropriate controls are then engaged to reverse the saw carriage drive pinion rotational direction, thereby starting movement of saw blade carriage assembly 40 (and saw blade 48) in the opposite direction. Preferably, the direction of rotation of saw blade 48 is also reversed at this time, and the remaining cut is made with this reversed blade rotation direction; however it is understood that saw blade 48 rotation may continue in the original rotational direction, even after the saw blade carriage assembly 40 reverses direction. The saw blade carriage assembly 40 and saw blade 48 move in the reverse direction, past the original starting position, then start movement back up the other half of U-shaped track 30. It can be readily understood that saw blade 48 again comes into contact with the uncut portion of pile 200, and starts its cut up the other side of pile 200. In like manner, saw blade carriage assembly 40 and saw blade 48 continue moving to the other end of U-shaped track 30, in the process cutting the uncut portion of pile 200 in the kerf as the cut on the opposite side. With saw blade 48 cutting past the center line, once saw blade 48 reaches the opposite end of U-shaped track 30, pile 200 is completely severed. The cut portion of pile 200 is being gripped by pile cutter 10, and can then be manipulated to a desired laydown location.

As noted above, pile cutter 10 preferably comprises a control system, comprising appropriate controls, hydraulic pumps, hoses, digital processors, etc. to carry out the above described exemplary cutting process. Manual operation is also possible.

CONCLUSION

While the preceding description contains many specificities, it is to be understood that same are presented only to describe some of the presently preferred embodiments of the invention, and not by way of limitation. Changes can be made to various aspects of the invention, without departing from the scope thereof. For example, dimensions may be varied to accommodate particular pile dimensions, etc.; various aspects of the use of the pile cutter may be automated to some degree; saw blade types may be varied depending upon the types of piles being cut; in addition to cutting concrete reinforced piles, the apparatus could be used to cut steel pipes, wooden pilings, etc.; various apparatus can be used to position the pile cutter, including but not limited to an excavator, crane, boom type machine, etc.

Therefore, the scope of the invention is to be determined not by the illustrative examples set forth above, but by the appended claims and their legal equivalents.

We claim:

1. A pile cutter, comprising:
   a frame comprising a pile receiving area, having a center line defined therein when said pile receiving area is viewed from above;
   a generally U-shaped track disposed in said frame around said pile receiving area;
   a saw blade carriage assembly mounted on said U-shaped track and movable around substantially the length of said U-shaped track, said saw blade carriage assembly carrying a single circular saw blade rotatable by a powered rotary driver;
   a means for moving said saw blade carriage assembly around said U-shaped track; and
   said U-shaped track, said saw blade carriage assembly and said saw blade dimensioned such that said saw blade cuts past said center line of said pile receiving area, whereby a pile disposed within said pile receiving area is fully cut by said saw blade as said saw blade carriage assembly moves along substantially the full length of said U-shaped track.

2. The pile cutter of claim 1, further comprising a control system comprising a digital processor operatively connected to said pile cutter and controlling movement of said saw blade carriage assembly.

3. The pile cutter of claim 2, wherein said means for moving said saw blade carriage assembly comprises a rotary drive means and gear engaging a gear track on said U-shaped track.

4. The pile cutter of claim 3, wherein said saw blade carriage assembly further comprises two pivot arm assemblies, each comprising a pair of rollers, each of said pair of rollers engaging beveled edges on an inner and outer edge of said U-shaped track, whereby said saw blade carriage assembly is suspended from said U-shaped track while movable along said U-shaped track.

5. The pile cutter of claim 4, further comprising a means for gripping a pile disposed within said pile receiving area, thereby fixing said pile cutter with respect to said pile.

6. The pile cutter of claim 5, whereby said means for gripping a pile comprises a hydraulically powered plate and a pair of opposing hydraulically powered gripping pads.

7. The pile cutter of claim 6, further comprising a back plate positioned within said pile receiving area, against which a pile may be positioned during cutting.

8. The pile cutter of claim 7, further comprising a top attachment for attaching said pile cutter to a lifting device; and an outlet for delivering cooling and lubricating fluid to said saw blade during cutting.

9. The pile cutter of claim 8, wherein said saw blade comprises diamond tipped cutting surfaces.

10. The pile cutter of claim 8, wherein said top attachment comprises a hydraulic cylinder for controlling a tilt position of said pile cutter, and a means for rotating said pile cutter around a vertical axis.

11. A pile cutter, comprising:
   a frame comprising a pile receiving area, having a center line defined therein when said pile receiving area is viewed from above;
   a generally U-shaped track disposed in said frame around said pile receiving area;
   a saw blade carriage assembly mounted on said U-shaped track and movable around substantially the length of said U-shaped track, said saw blade carriage assembly comprising:
      a single circular saw blade rotatable by a powered rotary driver;
      a rotary drive means and gear engaging a gear track on said U-shaped track, whereby rotation of said rotary drive means moves said saw blade carriage assembly around said U-shaped track;
      two pivot arm assemblies, each comprising a pair of rollers, each of said pair of rollers engaging beveled edges on an inner and outer edge of said U-shaped track, whereby said saw blade carriage assembly is suspended from said U-shaped track while movable along said U-shaped track;
   said U-shaped track, said saw blade carriage assembly and said saw blade dimensioned such that said saw blade cuts past said center line of said pile receiving area, whereby a pile disposed within said pile receiving area is fully cut by said saw blade as said saw blade carriage assembly moves along substantially the full length of said U-shaped track; and
   a control system comprising a digital processor operatively connected to said pile cutter and controlling movement of said saw blade carriage to one end of said U-shaped track, then to the other end of said U-shaped track.

12. The pile cutter of claim 11, further comprising a hydraulically powered plate and a pair of opposing hydraulically powered gripping pads, whereby a pile disposed within said pile receiving area can be gripped by said hydraulically powered plate and said pair of opposing hydraulically powered gripping pads and said pile cutter fixed in position relative to said pile.

13. The pile cutter of claim 12, further comprising a top attachment on said frame, said top attachment comprising a hydraulic cylinder for controlling a tilt position of said pile cutter, and a means for rotating said pile cutter around a vertical axis.

14. A method of cutting a pile with a single saw blade, comprising the steps of:
   a. providing a pile cutter, comprising:
      a frame comprising a pile receiving area, having a center line defined therein when said pile receiving area is viewed from above;
      a generally U-shaped track disposed in said frame around said pile receiving area;
      a saw blade carriage assembly mounted on said U-shaped track and movable around substantially the length of said U-shaped track, said saw blade carriage assembly carrying a single circular saw blade rotatable by a powered rotary driver;
      a means for moving said saw blade carriage assembly around said U-shaped track;
      a means for gripping a pile, positioned within said pile receiving area;
      a control system comprising a digital processor operatively connected to said pile cutter and controlling movement of said saw blade carriage;
      said U-shaped track, said saw blade carriage assembly and said saw blade dimensioned such that said saw blade extends past said center line of said pile receiving area, when said saw blade carriage assembly is positioned on one side of said U-shaped track;
   b. positioning a pile within said pile receiving area;
   c. with said saw blade being rotated by said powered rotary driver, moving said saw blade carriage assembly first to one end of said U-shaped track, then reversing the direction of movement of said saw blade carriage assembly and moving said saw blade carriage assembly to a second end of said U-shaped track, whereby a pile disposed within said pile receiving area is fully cut by said saw blade.

15. The method of claim 14, comprising the further step of:
   d. gripping said pile with said means for gripping a pile, thereby fixing said pile cutter in position relative to said pile.

16. The method of claim 15, further comprising the step of continuing to grip the section of pile above the cut with the means for gripping a pile, while said section of pile is moved to a desired position.

17. The method of claim 14, wherein step (c) includes the step of reversing the direction of rotation of said saw blade, when said direction of movement of said saw blade carriage assembly is reversed.

\* \* \* \* \*